Aug. 27, 1935.  H. RUSTING ET AL  2,012,352
MOTION PICTURE CAMERA
Filed July 21, 1933
FIG:1
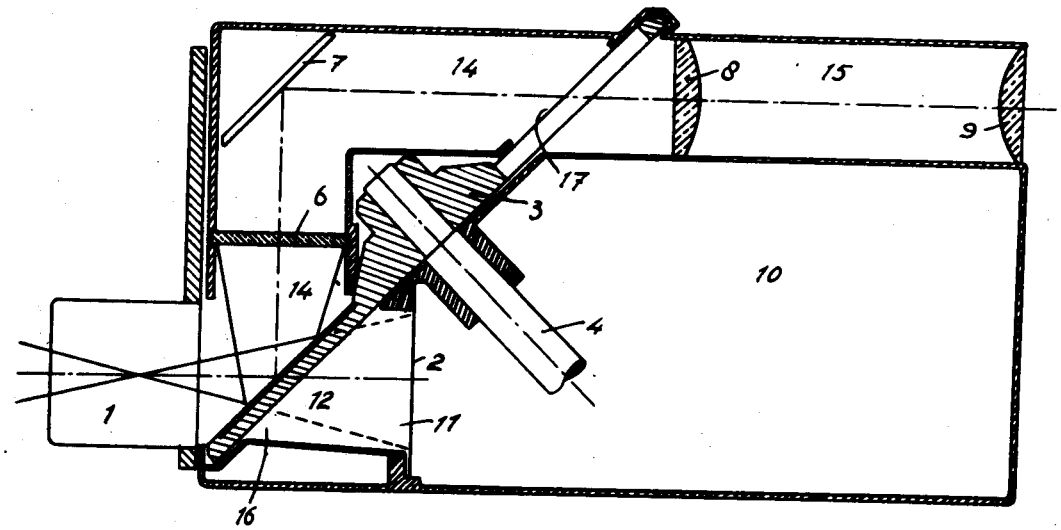
FIG:2
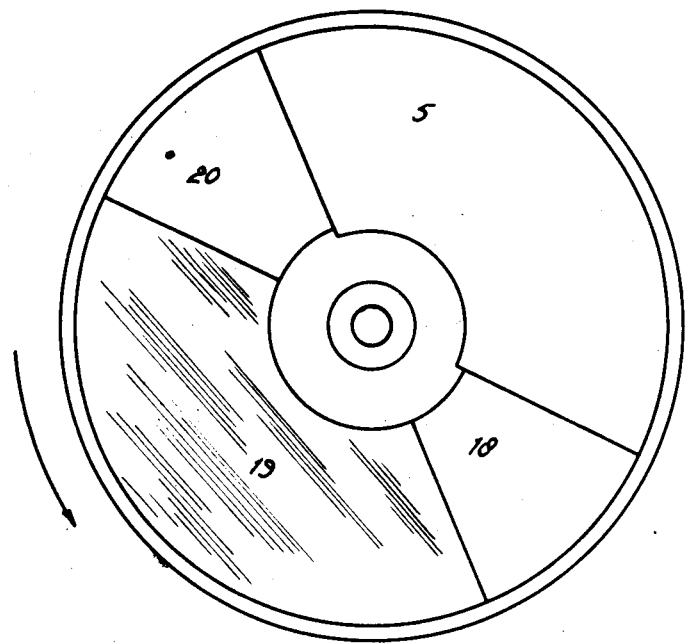
Inventors:
Hendrik Rusting and
Nicolaas Rusting Jr.
By Emil Bömelycke
Attorney Patented Aug. 27, 1935

2,012,352

UNITED STATES PATENT OFFICE 2,012,352

MOTION PICTURE CAMERA

Hendrik Rusting, Zuilen, and Nicolaas Rusting, Jr., The Hague, Netherlands

Application July 21, 1933, Serial No. 681,640
In the Netherlands July 22, 1932

17 Claims. (Cl. 88—16)

The invention relates to a motion picture camera comprising a direct vision view finder enabling the setting of the objective as well as the field of the pictures taken to be accurately and continuously supervised during the operation of the camera.

To this effect it is known to make use of a rotating shutter the plane of rotation of which is at an angle of substantially 45 degrees to the optical axis of the objective. Between the successive exposures of the light sensitive material the light entering through the objective is deflected into a finder by a reflecting portion of the shutter surface and during the exposures the shutter is effective to prevent light from penetrating through the finder and striking the light sensitive material. It is an important advantage of moving picture cameras of this type that the same objective is used for producing the supervising image and for taking the pictures, so that the finder image may be made to be absolutely identical to the image taken on the light sensitive material.

A drawback is, however, that only objectives of comparatively long focal length and small relative aperture may be applied. This is due to the fact that the rotating shutter in order to be actually adapted to prevent harmful light from penetrating through the finder and striking the film must be provided with special means as secondary shutters which occupy a good deal of space, and produce an increased minimum distance between the objective and the light sensitive material, and moreover enable only objectives of comparatively small relative aperture to be employed. Further the construction is complicated by such means which makes the camera more liable to be damaged.

This difficulty is removed by adopting the system according to the invention.

According to the invention harmful light is prevented from penetrating to the film during the successive exposures by adapting the finder to be closed during these periods by a suitable portion of the plane of the rotating shutter itself.

When applying this principle it is no longer necessary to provide the rotating shutter with special means for intercepting the light entering through the finder.

As a consequence the distance between the objective and the light sensitive material may be reduced to the value necessary for the employment of objectives of shorter focal length. Further the relative aperture may be increased, if necessary, and a plurality of objectives may be fitted on a rotatable objective carrier or turret head. These characteristics are of fundamental importance for the general utility of a motion picture camera.

In view of the space available the best construction will be obtained by so arranging the individual parts that the center of rotation of the revolving shutter is situated at the same side of the optical axis of the objective as the finder.

This and other characteristics of the camera according to the invention will be explained hereinafter in the specification following by reference to the accompanying drawing showing by way of example one form of construction embodying the invention.

Fig. 1 is a diagrammatic view illustrating a cross section of a motion picture camera according to the invention taken along a plane through the optical axis of the objective and perpendicular to the direction of movement of the light sensitive material along the film gate.

Fig. 2 is a view of the rotating shutter as seen in the direction of its axis of rotation from the side facing the objective.

The objective 1 produces an image on the film 2. Between the objective and the film there is a shutter 3 rotatable about a shaft 4 situated in the plane of the drawing. The shutter is provided with an opening or a light transmitting portion 5. When the shutter is rotating about the shaft 4 the light entering through the objective is alternately passed to and cut off from the film 2. When the light is passed to the film the latter is stationary and when the light is intercepted the film is fed to its next position in the usual manner by a suitable feed device.

A portion 19 (Fig. 2) of that side of the shutter facing the objective 1 is provided with a reflecting surface and the adjacent portions 18 and 20 are dead black. The object of the portion 18 and 20 will be explained later. The shaft 4 of the shutter is at an angle of substantially 45 degrees to the optical axis of the objective 1. When the shutter is closed the light entering the camera through the objective 1 is deflected by the reflecting surface 19 of the shutter and produces an image on a ground glass or other suitable screen 6 mounted in a position corresponding to the position of the film 2 with respect to the objective 1. The view of the image produced on the ground glass 6 is the same in size as the film gate. The image on the ground glass 6 may be observed by way of a mirror 7 through an optical system comprising two positive lenses 8 and 9.

This optical system operates as an astronomical telescope and it enables the ground glass image to be observed with the magnification necessary to enable accurate supervision and correction of the objective setting. By suitably selecting the focal lengths of the lenses 8 and 9 the supervision image may be observed at the same angle of view as the scene taken is seen when directly observed by the bare eye from the position of the camera objective. Due to the double reflection of the light by way of the mirrors 3 and 7, and the application in the finder of an optical system of the type of an astronomical telescope the image on the ground glass will be seen the right way up and the right way round.

By means of this arrangement it will be possible between the successive exposures of the light sensitive material to supervise the pictures produced by the objective by means of the ground glass images observed through the finder. Consequently the setting of the objective may be corrected if necessary during the actual operation of the camera.

As the finder lens 9 is fitted in the outer wall of the camera means must be provided for preventing light from penetrating through the optical system 8, 9 and spoiling the light sensitive material when the latter is being exposed to the objective.

According to the invention a portion of the revolving shutter 3 is applied for the plane of the observing system for this purpose, thus making it superfluous to provide special means such as secondary shutters.

Fig. 1 shows that the center of rotation of the revolving shutter is situated at the same side of the optical axis of the objective as the finder. Further the camera is divided into a number of separate chambers 10, 12, 14, 15. In the chamber 10 the light sensitive material is situated. This chamber is completely closed with the exception of the film gate 11. Opposite this gate is a chamber 12 having an opening 16 which may be completely closed by the shutter 3. At the other side of the shutter is the chamber 14 into which light may enter through the objective and which contains the ground glass 6 and the mirror 7. Between the chamber 14 and the chamber 15 enclosing the optical system 8, 9 there is an opening 17 the size of which is given by the cross section of the chambers 14 and 15 or by a suitable window provided in a wall between these chambers. The opening or window 17 and the opening 16 are alternately closed and opened by the same portion of the shutter 3. For this purpose said shutter is of such design that the opening 16 is closed when the opening 17 is open and that the opening 16 can only be open when the opening 17 is closed. Further the ground glass may be observed during part of the time that the opening 16 is closed. In this way it is attained in the simplest manner that no light can reach the film through the optical system 8, 9 as long as the film is exposed to the light entering through the objective, and that the ground glass may be observed through the opening 17 when the shutter has closed the opening 16.

To this effect a special arrangement of the optical axes of the observing system and the objective, and a special construction of the shutter has been devised. The optical axes referred to intersect the shutter plane at two points arranged opposite each other with respect to the shutter shaft. The opening 5 provided in the shutter comprises an angle of (180−α) degrees (see Fig. 2). The angle α is of such magnitude that the sector enclosing this angle is able to close the opening 16 and the opening 17. The closed sector of the shutter comprises an angle of (180+α) degrees. This angle is divided into three smaller sectors 18, 19 and 20 the sectors 18 and 20 being dead black and the sector 19 having a reflecting surface. Each of the sectors 18 and 20 comprises an angle of α degrees.

In applying this construction each complete revolution of the shutter is composed of the following seven distinct periods:

(a) Opposite the opening 16 is the open or light transmitting section 5 of the shutter 3. As the latter comprises an angle of less than 180 degrees the opening 17 will always be closed during this period.

(b) The closed sector of the shutter 3 and more particularly the dead black portion 18 thereof partly covers the opening 16. During this period the opening 17 is constantly closed as the open sector 5 of the shutter comprises an angle (of 180−α) degrees and the dead black sector 18 comprising an angle α is able to cover the opening 16 completely. Consequently no light entering through the finder can reach the ground glass or the film and no image is produced on the ground glass 6 by the objective 1 during this period. If this condition were not fulfilled reflection on the ground glass would produce diffused light which might cause the film to be spoiled.

(c) The dead black portion 18 completely covers the opening 16. The opening 17 is completely closed. The film feed commences.

(d) The separation between the dead black sector 18 and the reflecting sector 19 passes through the beam of light entering the lens and the separation between the closed sector 20 and the open sector 5 passes the opening 17, these separations being situated opposite each other with respect to the center of rotation of the shutter. The image on the ground glass becomes visible through the finder. The light entering through the optical system cannot do any harm as the opening 16 is completely closed.

(e) The reflecting sector is in front of the opening 16. The objective 1 produces an image on the ground glass. This image is visible through the finder as the open portion of the shutter is opposite the opening 17.

(f) The sector 20 is midway in front of the opening 16 and the sector 18 is midway in front of the opening 17. Both the opening 16 and the opening 17 are closed. The film feed is finished.

(g) The shutter opening 5 comes in front of the opening 16 and the image produced by the objective is projected on the film. The ground glass is neither exposed from the side of the lens as the sector 20 is dead black nor from the side of the finder as the opening 17 is closed. One complete revolution of the shutter is now finished and the same cycle may start again.

It will be obvious that many details of the constructional form just described may be modified without leaving the scope of the invention.

For instance instead of a ground glass for producing the supervising or finder image some other kind of screen as a system of spider lines or equivalent means may be applied. Or the finder image may be observed by another magnifying system, or directly by the bare eye without any magnifying system at all.

The open part of the rotating shutter may be of glass or other light transmitting material, or may be left open.

What we claim is:—

1. A motion picture camera comprising an objective lens for projecting an image on a film, a view finding system adapted to receive an image through the objective, a rotary shutter having an opaque portion mounted to pass between the objective and film to shut off light from the film and reflect the image from the objective into the view finding system, and a chamber containing an optical system for viewing the image received in the view finding system, said chamber being positioned in the path of travel of the shutter and provided with an aperture for the passage of the shutter during its rotation, the shutter being provided with an opening enabling the image, when reflected into the view-finding system by the opaque portion of the shutter, to be observed through the optical system.

2. A motion picture camera comprising an objective lens for projecting an image on a film, a view finding system adapted to receive an image through the objective, a rotary shutter having an opaque portion mounted to pass between the objective and film to shut off light from the film and reflect the image from the objective into the view finding system, and a tube for observing the view finding system, said tube being intersected by the path of travel of the shutter and having an aperture for the passage of the shutter during its rotation, the shutter being adapted to shut off light passing through said tube when in certain of its positions of rotation.

3. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a tube for observing the view finding system, said tube being positioned in the path of travel of the shutter and provided with an aperture for the passage of the shutter during its rotation, the optical axis of the objective lens intersecting the path of travel of the shutter at a point on one side of its axis of rotation, and the optical axis of the view observing tube intersecting the path of travel of the shutter at a point on the other side of its axis of rotation.

4. A motion picture camera comprising an objective lens for projecting an image on a film, a view finding system adapted to receive an image through the objective, a rotary shutter having an opaque portion mounted to pass between the objective and film to shut off light from the film and reflect the image from the objective into the view finding system, and a tube for observing the view finding system, said tube having its axis arranged at an angle to the path of travel of the shutter and said tube intersecting the path of travel of the shutter so that the tube will be closed by the shutter when in certain of its positions of rotation, and the optical axis of the tube being so positioned relative to the optical axis of the objective and the opaque portion of the shutter being sufficiently extensive to completely close the tube until the film is completely covered.

5. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a tube for observing the view finding system, said tube having its axis arranged at an angle to the path of travel of the shutter and said tube intersecting the path of travel of the shutter so that the tube will be closed by the shutter when in certain of its positions of rotation, the optical axis of the objective lens intersecting the path of travel of the shutter at a point on one side of its axis of rotation, the optical axis of the view observing tube intersecting the path of travel of the shutter at a point on the opposite side thereof, and the shutter being of a sufficiently large size to completely close the tube until the film is completely covered.

6. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a tube for observing the view finding system, said tube having its axis arranged at an angle to the path of travel of the shutter and said tube intersecting the path of travel of the shutter so that the tube will be closed by the shutter when in certain of its positions of rotation, and said shutter comprising a disc-like member including a sector defined by an angle of 180° plus a sector large enough to completely cover the tube and the film separately.

7. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a tube for observing the view finding system, said tube having its axis arranged at an angle to the path of travel of the shutter and intersecting the path of travel of the shutter so that the tube will be closed by the shutter when in certain of its positions of rotation, the optical axis of the objective lens intersecting the path of travel of the shutter at a point on one side of its axis of rotation, the optical axis of the view observing tube intersecting the path of travel of the shutter at a point on the other side of the axis of rotation, and said shutter comprising a disc-like member including a sector defined by an angle of 180° plus a sector large enough to completely cover the tube and the film separately.

8. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a tube for observing the view finding system, said tube having its axis arranged at an angle to the path of travel of the shutter and intersecting the path of travel of the shutter so that the tube will be closed by the shutter when in certain of its positions of rotation, said shutter comprising a plane disc having a sector-like transmitting portion, an opaque sector-like portion provided with a reflecting surface for reflecting the image received from the objective to the view finding system, and dead black opaque sectors positioned between the light transmitting and reflecting sectors, and said reflecting portion being diametrically positioned relative to the light transmitting portion and defined by an angle substantially equal to that of the light transmitting sector, the extent of the total opaque portion of the shutter being sufficient to completely close the tube until the film is completely covered.

9. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a tube for observing the view finding system, said tube having its axis arranged at an angle to the path of travel of the shutter and intersecting the path of travel of the shutter so that the tube will be closed by the shutter when in certain of its positions of rotation, the optical axis of the objective lens intersecting the path of travel of the shutter at a point on one side of its axis of rotation and the optical axis of the view observing tube intersecting the path of travel of the shutter at a point on the opposite side thereof, said shutter comprising a plane disc having a sector-like light transmitting portion, an opaque sector-like portion provided with a reflecting surface for reflecting the image received from the objective to the view finding system, and dead black opaque sectors positioned between the light transmitting and reflecting sectors, and said reflecting portion being diametrically positioned relative to the light transmitting portion and defined by an angle substantially equal to that of the light transmitting sector, the extent of the total opaque portion of the shutter being sufficient to completely close the tube until the film is completely covered.

10. A motion picture camera comprising an objective lens for projecting an image on a film, a view finding system adapted to receive an image through the objective, a rotary shutter mounted to pass between the objective and film to shut off light from the film and reflect the image from the objective into the view finding system, and a chamber containing an optical system for viewing the image received in the view finding system, said chamber being positioned in the path of travel of the shutter and provided with an aperture for the passage of the shutter during its rotation, said shutter comprising a plane disc having a sector-like light transmitting portion, an opaque sector-like portion provided with a reflecting surface for reflecting the image received from the objective to the view finding system, and dead black opaque sectors positioned between the light transmitting and reflecting sectors, and said reflecting portion being diametrically positioned relative to the light transmitting portion and defined by an angle substantially equal to that of the light transmitting sector, the extent of the total opaque portion of the shutter being sufficient to completely close the tube until the film is completely covered.

11. A motion picture camera comprising a film gate, an objective lens spaced from the gate for producing an image on the film associated with said gate, a wall confining the space between the objective lens and the film gate, a view finding system enclosed in a casing and having its optical axis parallel to the optical axis of the objective, and a shutter providing optical communication between the casing enclosing the view finding system and the enclosed space between the objective lens and the film gate, said shutter comprising a disc-like portion and being mounted to traverse the confined space to prevent light rays passing through the objective lens from falling on the film and also to traverse the casing of the view finding system to prevent the transmission of light therethrough to the confined space, and said shutter being provided with a light reflecting surface adapted to reflect light rays, passing through the objective, through the view finding system when the passage of light to the film is prevented by the position of the shutter.

12. A motion picture camera comprising a film gate, an objective lens spaced from the gate for producing an image on the film associated with said gate, a wall confining the space between the objective lens and the film gate, a view finding system enclosed in a casing and having its optical axis parallel to the optical axis of the objective, and a shutter providing optical communication between the casing enclosing the view finding system and the enclosed space between the objective lens and the film gate, said shutter comprising a disc-like portion and being mounted to traverse the confined space to prevent light rays passing through the objective lens from falling on the film and also to traverse the casing of the view finding system to prevent the transmission of light therethrough to the confined space, said shutter being provided with a light reflecting surface adapted to reflect light rays, passing through the objective, through the view finding system when the passage of light to the film is prevented by the position of the shutter, and said shutter being of a size sufficient to prevent the light rays falling on the film until the view finding system is completely shut off from the confined space.

13. A motion picture camera comprising an objective lens for producing an image on a film, a rotary shutter having its axis inclined at an angle of 45° to the optical axis of the objective, a view finder, the optical axis of which is arranged at an angle of substantially 90° to the optical axis of the objective, said shutter being mounted to shut off the film from exposure to the image projected by the objective and having a reflecting surface for reflecting the image to the view finder, and a tube for observing the image in the view finder, said tube having its optical axis substantially parallel to the optical axis of the objective, and said shutter having a disc-like portion, the path of rotation of which is intersected by the optical axis of the objective and by the tube for observing the view finder, and the extent of said disc-like portion being such that the view finder observing tube is closed while the film is being exposed.

14. A motion picture camera comprising an objective lens for producing an image on a film, a rotary shutter having its axis inclined at an angle of 45° to the optical axis of the objective, a view finder, the optical axis of which is arranged at an angle of substantially 90° to the optical axis of the objective, said shutter being mounted to shut off the film from exposure to the image projected by the objective and having a reflecting surface for reflecting the image to the view finder, and a tube for observing the image in the view finder, said tube having its optical axis substantially parallel to the optical axis of the objective, and said shutter having a disc-like portion, the path of rotation of which is intersected by the optical axis of the objective and by the tube for observing the view finder, so that the view finder observing tube is closed while the film is being exposed, the optical axis of the objective lens intersecting the plane of the shutter at a point on one side of the axis of rotation, and the optical axis of the view observing tube intersecting the plane of the shutter at a point on the opposite side thereof.

15. A motion picture camera comprising an objective lens for producing an image on a film, a rotary shutter having its axis inclined at an angle of 45° to the optical axis of the objective, a view finder, the optical axis of which is arranged at an angle of substantially 90° to the optical axis of the objective, said shutter being mounted to shut off the film from exposure to the image projected by the objective and having a reflecting surface for reflecting the image to the view finder, and a tube for observing the image in the view finder, said tube having its optical axis substantially parallel to the optical axis of the objective, and said shutter having a disc-like portion, the path of rotation of which is intersected by the optical axis of the objective and by the tube for observing the view finder, so that the view finder observing tube is closed while the film is being exposed, the tube being so positioned relative to the optical axis of the objective and the shutter being of a sufficient size as to completely close the tube until the film is completely covered.

16. A motion picture camera comprising an objective lens for producing an image on a film, a rotary shutter having its axis inclined at an angle of 45° to the optical axis of the objective, a view finder, the optical axis of which is arranged at an angle of substantially 90° to the optical axis of the objective, said shutter being mounted to shut off the film from exposure to the image projected by the objective and having a reflecting surface for reflecting the image to the view finder, and a tube for observing the image in the view finder, said tube having its optical axis substantially parallel to the optical axis of the objective, said shutter having a disc-like portion, the path of rotation of which is intersected by the optical axis of the objective and by the tube for observing the view finder, so that the view finder observing tube is closed while the film is being exposed, and said shutter comprising a disc-like member including a sector defined by an angle of 180° plus a sector large enough to completely cover the tube and the film separately.

17. A motion picture camera comprising a film-containing chamber having a film-exposing opening, a second chamber communicating with the film chamber through said exposing opening, an objective lens associated with the second chamber and positioned to project an image on the film through said exposing opening, a view-finding screen in said second chamber, said second chamber having an observation window for observing the view-finding screen, a shutter movably mounted in said second chamber to pass between the objective lens and film-exposing opening to close the film-exposing opening, to reflect an image from said objective lens to said screen, and to pass in front of the observation window to close said window, the opaque portion of said shutter being sufficiently extensive to maintain said film-exposing opening closed until said observation window is closed.

HENDRIK RUSTING.
NICOLAAS RUSTING, Jr.